United States Patent [19]

Guay

[11] 4,038,362

[45] July 26, 1977

[54] INCREASING THE RECOVERABILITY OF GOLD FROM CARBONACEOUS GOLD-BEARING ORES

[75] Inventor: Wilbur J. Guay, Newtown, Conn.

[73] Assignee: Newmont Explorations Limited, Danbury, Conn.

[21] Appl. No.: 738,868

[22] Filed: Nov. 4, 1976

[51] Int. Cl.$^2$ .............................................. C01G 7/00
[52] U.S. Cl. ....................................... 423/40; 423/29
[58] Field of Search ................. 423/29, 40; 75/101 R, 75/105, 112, 118

[56] References Cited

U.S. PATENT DOCUMENTS

| | | | |
|---|---|---|---|
| 1,734,306 | 11/1929 | Schraps | 75/105 |
| 2,777,764 | 1/1957 | Hedley et al. | 75/105 |
| 3,574,600 | 4/1971 | Scheiner et al. | 75/101 R |
| 3,846,124 | 11/1974 | Guay | 75/118 |

Primary Examiner—O. R. Vertiz
Assistant Examiner—Brian E. Hearn
Attorney, Agent, or Firm—Pennie & Edmonds

[57] ABSTRACT

The recoverability by cyanidation of the gold content of sedimentary gold-bearing ores containing organic carbonaceous material and gold-bearing pyrite, or other gold-bearing sulfides, is greatly increased by heating an aqueous slurry of the ore to about 167° to 212° F. and then introducing air or oxygen into the heated slurry to oxidize and eliminate a substantial portion of the carbonaceous material and oxidizable sulfides in the slurried ore, followed by cooling the slurry to about 70° to 85° F. and then introducing chlorine gas into the slurry to substantially complete the oxidation and chlorination of the carbonaceous content of the slurried ore. The ore is then subjected to conventional cyanidation to recover the gold content thereof.

3 Claims, No Drawings

INCREASING THE RECOVERABILITY OF GOLD FROM CARBONACEOUS GOLD-BEARING ORES

BACKGROUND OF THE INVENTION

1. Field of the Invention

This invention relates to the treatment of gold ores of sedimentary origin which are characterized by a significant content of organic carbonaceous and sulfidic mineral materials.

2. The Prior Art

Sedimentary gold-bearing ores containing indigenous organic carbonaceous material are notoriously refractory to standard cyanidation treatment for the recovery of their gold content. Investigation into the cause of this problem has indicated that the carbonaceous material comprises active carbon and long-chain organic compounds. The active carbon appears to absorb the gold cyanide complex $[Au(CN)_2^-]$ from cyanide leaching solutions, and the long-chain organic compounds appear to form stable complexes with the gold. In order to overcome this sequestering of the gold, experiments have been conducted by the United States Bureau of Mines in which they used a wide variety of oxidation pretreatment systems including ozone, sodium hypochlorite, calcium hypochlorite, permanganates, perchlorates, chlorates and oxygen. Of these the hypochlorites appeared to be the most effective, and although an elevated temperature was required it was found that temperatures above about 60° caused premature decomposition of the hypochlorites. Consequently, it was determined that a temperature within the range of 50° to 60° C (122° to 140° F) was required for effective hypochlorite treatment to render the gold component of the ore amenable to standard cyanidation treatment. At room temperature (about 70° F), the hypochlorite treatment requires several days for the required reaction to make the gold content of the ore available for recovery by cyanidation.

In a previous patent issued to Wilbur J. Guay, U.S. Pat. No. 3,846,124 of Nov. 5, 1974, it was shown that the recoverability, by standard cyanidation, of the gold content of organic carbon-containing sedimentary gold bearing ores is increased by slurrying the ground ore with water, charging chlorine gas to the slurry to the extend that the slurry will absord the chlorine, and holding the thus treated slurry for at least 6 hours while maintaining it at the chlorination treatment temperature of about 70°-85° F.

It has now been determined that a substantial portion of the oxidation of elemental carbon and organic carbonacous compounds can be accomplished with oxygen, or air by bubbling either of these reagents through a ground slurry of ore and water for periods of 8 to 24 hours in a temperature range of 167° to 212° F. It has also been determined that pyrite, $FeS_2$, is oxidized by the aeration treatment, and in the case of gold-bearing pyrites additional gold is thus released for later recovery by cyanidation. Other gold-bearing sulfides would also be oxidized by the aeration treatment, thus releasing gold for later recovery by cyanidation. Inasmuch as the oxygen or air treatment does not oxidize all of the organic compounds present it is necessary to follow the oxygen or air treatment by bubbling chlorine through the ground slurry of ore and water to oxidize the more difficulty oxidizable compounds for an additional period at a rate such that the chlorine will be substantially completely adsorbed by the slurry. The chlorine addition is terminated when the slurry will no longer react with the chlorine, as evidenced by the presence of a significant amount of chlorine being evolved from the slurry even when it is added to the slurry at a low rate.

SUMMARY OF THE INVENTION

Pursuant to the present invention an aqueous slurry of the ore, in the absence of extraneous alkaline material, is maintained at a temperature in the range of 167° to 212° F while it is treated with as much oxygen as it will absorb, either bubbling air or oxygen into the ore slurry. This requires from 8 to 24 hours for the maximum oxidation by air. The ore is then treated with as much chlorine as it will absorb in the temperature range 70° to 85° F and held thereafter for a period of 6 to 12 hours while the chlorine digestion is completed.

DETAILED DESCRIPTION

The sedimentary gold-bearing ore containing organic carbonaceous and gold-bearing mineral sulfide materials is prepared for treatment pursuant to the invention by wet grinding the crushed ore to about 60 wt. percent minus 200 mesh (Tyler standard screen) with sufficient water so that it will form a slurry with about 40 to 50% solids in water. No extraneous components are used in forming this slurry, including extraneous alkaline material, so that it will have a pH ranging between 6 and 10 resulting solely from the slurrying of only the ore with water. The resulting slurry is heated to a temperature within the range of 167° to 212° F by conventional means.

Air, or oxygen, is then dispersed through the heated slurry, advantageously by bubbling it into the bottom of the slurry mass by any conventional and appropriate device at a rate such that it will be present in excess of the amount required for the reaction with the carbonaceous compound and gold-bearing sulfides. Generally, this bubbling of the air or oxygen into the slurry will be accompanied by sufficient agitation to insure uniform exposure of the ore to the action of the air, or oxygen. The reaction between the oxygen and the carbonaceous components of the ore results in the evolution of carbon dioxide, nitrogen and excess oxygen from the slurried ore. The reaction between oxygen and the gold-bearing sulfides results in chemical compounds that remain in the slurry. The bubbling is continued until no further oxidation of carbonaceous compounds or gold-bearing sulfides by air, or oxygen, is being effected.

The slurry will then be cooled by conventional means to a temperature within the range of 70° to 85° F. Chlorine gas is then dispersed through the slurry, advantageously by bubbling it into the bottom of the slurry mass by any conventional and appropriate device at a rate such that it will be substantially completely absorbed by the slurry. Generally, this bubbling of the chlorine into the slurry provides sufficient agitation to insure uniform exposure of the ore to the action of the chlorine, although additional mechanical agitation is advantageous. The reaction between the chlorine and carbonaceous components of the ore takes so rapidly that the pH of the slurry quickly drops to within the range of about 5 to 7. As this chlorination proceeds, there is evolved from the slurry a gas consisting primarily of carbon dioxide, nitrogen and oxygen. The rate of addition of the chlorine to the slurry is advantageously reduced as the pH of the slurry is lowered to a value within the range of about 5 to 7 and then is terminated when the slurry will no longer react with the chlorine, as evidenced by the presence of a significant amount of chlorine being evolved from the slurry even when it is added to the slurry at a low rate.

The thus chlorinated slurry is then held at the aforementioned reaction temperature, without further addition of chlorine and without any further treatment, for a period of at least 6 hours, and preferably for a period of between 6 and 12 hours. During this period, the reaction mass equilibrates with resulting passivation or alteration of the carbonaceous content of the ore so that it will not significantly sequester the gold content of the ore when the thus-treated ore is subsequently subjected to standard cyanidation. Where the ambient temperature during this holding period drops and would otherwise permit the temperature of the reaction mass to fall below the aforementioned range of 70° to 85° F, heat is added to the mass by any conventional means in order to hold the temperature of the mass within this range, and preferably within the range of about 75° to 80° F.

The following specific example is illustrative, but not limitative, of the practice of the invention. A random mass of organic carbon-containing sedimentary gold-bearing ore from Carlin, Nevada, which contained about 0.4 ounce of gold per ton, about 1 percent pyrite ($FeS_2$), and from 0.9 to 4.3% total carbon (about 0.3 to 0.7% carbon in the organic form), was crushed to minus 10 mesh (Tyler) and then was wet ground with water (60 wt. percent ore, 40% water, by weight) to yield an aqueous slurry containing the ore in approximately 60% minus 200 mesh particle size. The ground ore slurry or pulp was then transferred to an open vessel where it was continuously stirred while water was added so as to adjust the pulp to between 40 and 50% by weight of solids. The slurry was heated to within the range of about 200° to 210° F. and was maintained at this temperature for 8 hours. Oxygen was bubbled through the heated slurry at the rate of 0.1 liters per minute (STP) for 8 hours with the concomitant evolutions of carbon dioxide, nitrogen and excess oxygen from the slurry, indicating that a substantial portion of the organic carbonaceous components of the ore has been oxidized and eliminated from the slurry. The slurry was then cooled to within 80° to 85° F. and was maintained at this temperature for 8 hours. Chlorine was bubbled into and dispersed through the slurry for 8 hours for a total amount of 38.1 pounds of chlorine per ton of slurried ore. The slurry was then filtered and the filter cake washed with fresh water. The solids were then repulped with fresh water and cyanided for 16 hours to extract the gold. An extraction of 77% of the gold was achieved. An identical sample of the same lot of ore required 85.8 lb of chlorine pretreatment to give 77% gold extraction by cyanidation when the oxygen pretreatment of the ore was omitted. The chlorine requirement was thus reduced from 85.8 lb per ton of ore to 38.1 lb per ton of ore, a reduction 55.6%. Microscopic examination of an untreated sample of this ore and of a sample which had been aerated, but not chlorinated, showed that the aeration had extensively oxidized the pyrite content of the ore to iron oxide. Thus, the oxidation of pyrite by air also contributed to the the reduced chlorine consumption.

I claim:

1. The method for treating sedimentary gold-bearing ore containing indigenous organic carbonaceous material and gold-bearing sulfides so as to increase the recoverability of its gold content by standard cyanidation extraction which comprises: slurrying the ore with water in the absence of extraneous alkaline material; adjusting the temperature of the slurry to about 167° to 212° F, and dispersing air or oxygen throughout the slurry at a rate and for a period of time such as the slurry will continue to absorb oxygen as the oxygen reacts with the organic carbonaceous components and the sulfice content of the ore; adjusting the temperature of the slurry to about 70° to 85° F, and dispersing chlorine gas throughout the slurry at a rate and for a period of time such as the slurry will continue to absorb the chlorine with evolution of carbon dioxide, nitrogen, and oxygen, as the chlorine reacts with the organic carbonaceous components of the ore and only until a significant amount of chlorine gas is liberated from the chlorinated slurry; and maintaining the thus chlorinated slurry at a temperature within the range of about 70° to 85° F for a period of about 6 to 12 hours with the resulting production of a slurry-solids content in which the gold component is amenable to at least 75 weight percent extraction by standard cyanidation practice.

2. The method according to claim 1 in which the air or oxygen is dispersed throughout the heated slurry for a period of between about 8 to 24 hours.

3. The method according to claim 1 in which the chlorine gas is dispersed throughout the slurry for a period of between about 6 to 12 hours.

* * * * *